March 27, 1934.  C. G. KELLER  1,952,076
VEHICLE WHEEL
Original Filed Dec. 11, 1926  3 Sheets-Sheet 1
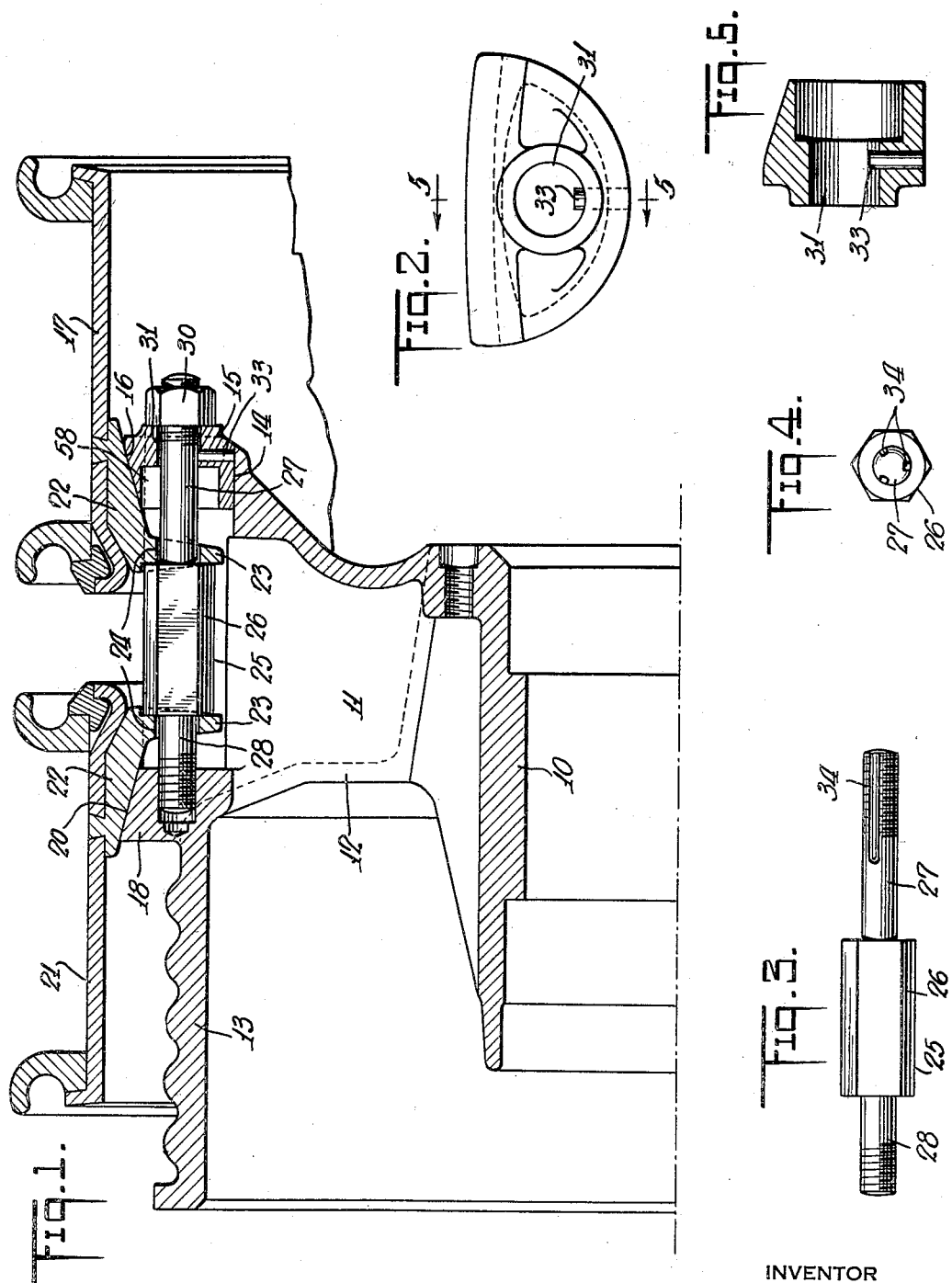
INVENTOR
*Charles G. Keller*
BY
*Dean Fairbank Hirsch & Foster*
ATTORNEYS March 27, 1934.  C. G. KELLER  1,952,076
VEHICLE WHEEL
Original Filed Dec. 11, 1926  3 Sheets-Sheet 2
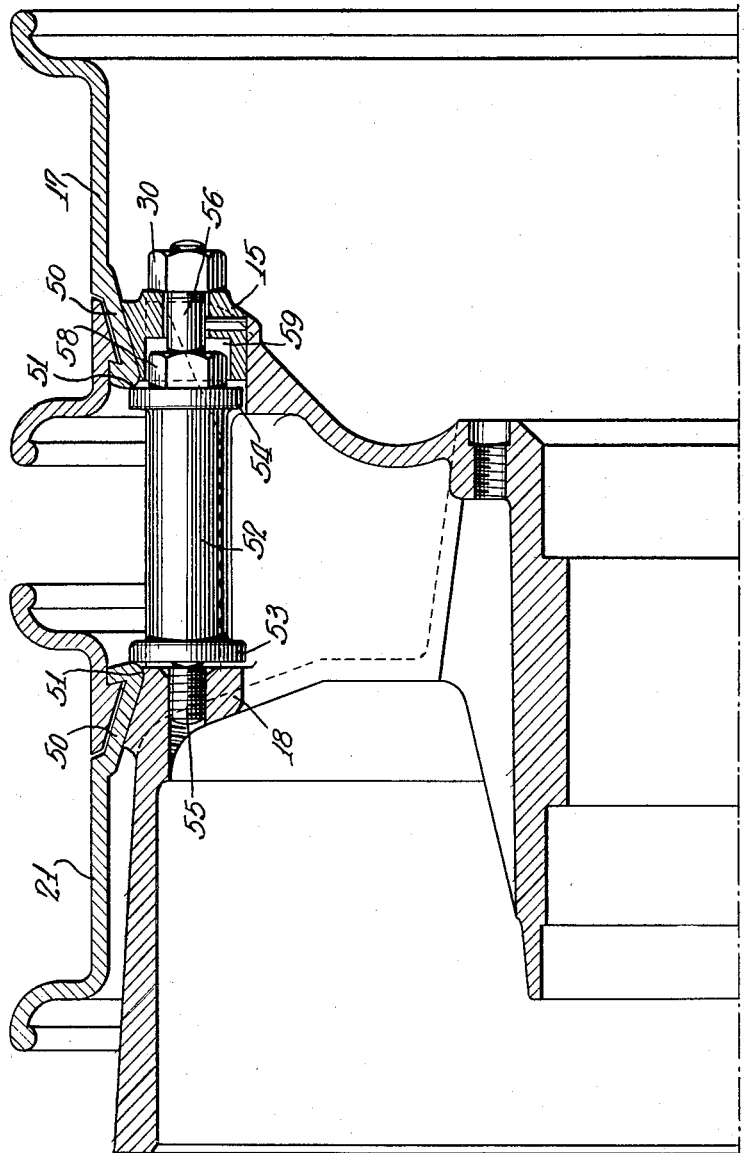
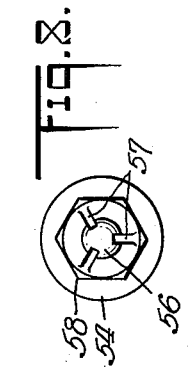
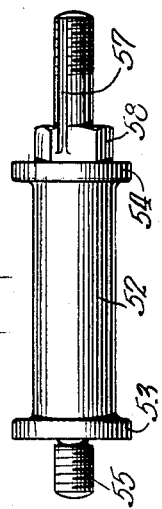
INVENTOR
*Charles G. Keller*
BY
*Dean Fairbank Hirsch Foster*
ATTORNEYS March 27, 1934.     C. G. KELLER     1,952,076
VEHICLE WHEEL
Original Filed Dec. 11, 1926     3 Sheets-Sheet 3
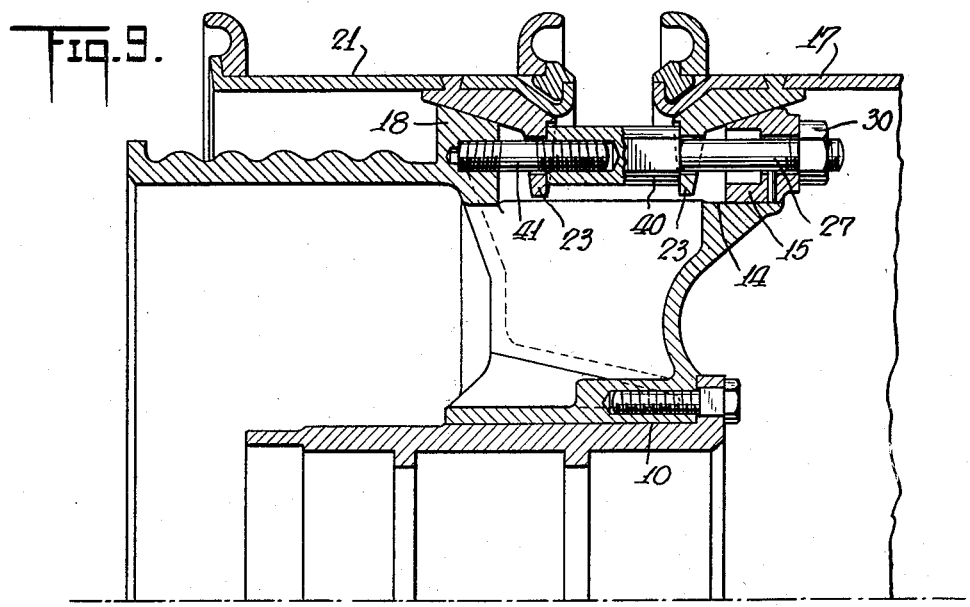
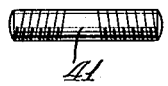
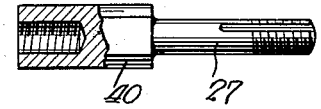
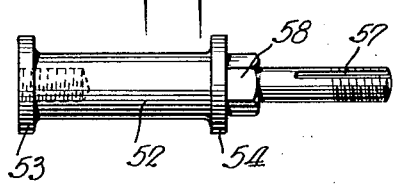
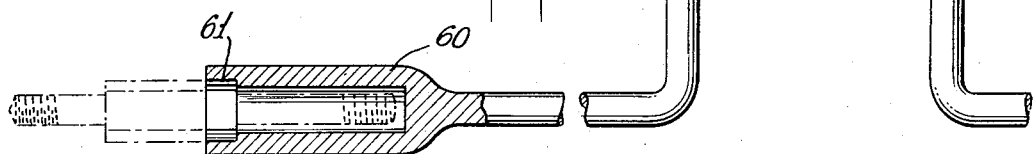
INVENTOR
*Charles G. Keller*
BY
ATTORNEYS Patented Mar. 27, 1934

1,952,076

UNITED STATES PATENT OFFICE 1,952,076

VEHICLE WHEEL

Charles G. Keller, Hyde Park, N. Y.

Original application December 11, 1926, Serial No. 154,092. Divided and this application September 15, 1931, Serial No. 562,863

10 Claims. (Cl. 301—13)

The present application is a division of my application on which was granted Patent No. 1,827,790 on October 20, 1931. The present invention is an improvement in dual tired vehicle wheels, and relates particularly to the means for detachably securing in place the separate rims in spaced relationship.

One object of the invention is to provide the vehicle wheel with members which serve the combined functions of clamping the two rims in position, accurately spacing said rims in predetermined relationship, and preventing circumferential creeping of said rims.

Another object of the invention is to provide a single series of fastening members which serve to clamp the two rims in position in predetermined spaced relationship, which serve to clamp either the inboard rim or the outboard rim in position independently of the other rim, or to clamp both rims. The arrangement permits the dismounting of the outboard rim from the wheel without disturbing the clamped position of the inboard rim.

The present invention may be utilized in connection with different standard forms of rims, for instance those commonly known as the Goodyear rim and the Firestone rim, without necessitating any changes in the wheel construction or the rim.

As an important feature of the present invention, fastening members are provided in the form of bolts having shoulders secured thereto against sliding axial movement therealong, said shoulders engaging adjacent rims to hold them in spaced relationship. These shoulders may be threaded on to the bolt to permit them to be selectively positioned along said bolt, or they may be made integral therewith. By this arrangement, the position of the shoulders with respect to the bolts may be predetermined, and the rims correspondingly clamped in accurate axial alignment with the vehicle wheel.

As another important feature of the present invention, fastening members are provided in the form of double ended bolts carrying shoulders which engage adjacent rims to keep them a predetermined distance apart, and having one set of ends threaded into the vehicle body, so as to be retained therein against axial movement in either direction.

As another feature of the present invention, there are provided a plurality of fastening members in the form of bolts having one set of ends engaging the vehicle body, and the other ends engaging lugs having seats for supporting one of said rims, these lugs being movable along said fastening elements to clamp the latter rim in position, said bolts presenting shoulders which engage adjacent rims and hold them in spaced relationship.

In the accompanying drawings, there are shown for purposes of illustration, various forms of the present invention, in which Fig. 1 is a section taken along the axis of the wheel and showing a pair of rims in mounted position and held therein by fastening means embodying one form of the present invention.

Fig. 2 is a face view of a lug used for fastening the outboard rim on a dual tire wheel.

Figs. 3 and 4 are side and end views respectively of the fastening member shown in Fig. 1.

Fig. 5 is a section taken on the line 5—5 of Fig. 2.

Fig. 6 is a section taken along the axis of the wheel and having mounted thereon a pair of rims, and showing another form of fastening means.

Figs. 7 and 8 are side and end views respectively of the fastening means shown in Fig. 6.

Fig. 9 is a view similar to Fig. 1, but showing a different form of fastening member.

Figs. 10 and 11 are side elevations of the parts of the fastening means shown in Fig. 9.

Fig. 12 is a side elevation of an alternative form of the bolt parts shown in Fig. 10, and Fig. 13 is a side elevation of a tool for operating some of the bolts illustrated, and the nuts used in conjunction therewith.

Like reference characters denote like parts in the several figures of the drawings.

In Fig. 1 there is shown a type of wheel which is particularly adapted for use in conjunction with my present invention and certain features of which are illustrated in greater detail and claimed in my Patent 1,827,790 above referred to.

In the construction here shown the body of the wheel is of spider of fellyless type and is provided with a hub 10 and a series of spokes cast integral therewith. Each spoke is substantially U-shaped in cross-section and opened on the inboard side and has side walls 11 connected by webs 12. A brake drum 13 may be provided integral with the inboard sides of the connecting webs 12.

Each spoke at its outer end has an axially extending, approximately semi-cylindrical guideway or recess 14 at the outboard side, and slidably mounted in said recess is a rim clamping member or lug 15 presenting an inclined surface or rim seat 16 for supporting the outboard rim 17. Each spoke at its radially outward end has a transverse wall or bridge piece 18 at the inboard side, said bridge piece presenting an inclined surface or rim seat 20 for supporting the inboard rim 21. This rim seat 20 is curved concentrically with the wheel and is inclined radially outwardly toward the inboard side of said wheel.

In Fig. 1 I have shown the tire rims 17 and 21 of a type known to the trade as "Firestone" rims. A rim of this type is formed with lugs 22, each of which has an inclined surface which seats on the rim seats 16 and 20 and a substantially radial projection 23 at the innermost part of said surface, these projections being formed with apertures 24.

The construction so far described forms no part of the present invention, but is merely set forth to show a type of wheel to which the present invention is particularly adapted.

As an important feature of the present invention, novel means are provided for fastening the two rims in position upon the vehicle body, such means being shown and more broadly claimed in my copending application Serial No. 182,199, filed April 9, 1927. This feature consists in the provision of fastening members connected at one end to the wheel, and at the other end to the lugs 15, each of said members presenting shoulders which abut said rims and hold them in predetermined spaced relationship.

In Fig. 1 this fastening member comprises a bolt 25 which passes through the apertures 24 and has threaded engagement at one end with a bridge piece 18, and at the other end engages the lug 15.

Each bolt of the type shown in Fig. 1 has a central body portion 26 from opposite ends of which project threaded shanks 27 and 28, these shanks engaging the lug 15 and the bridge piece 18 respectively. The body 26 may be hexagonal in cross-section or of any other non-circular form to provide a hold for the tool by means of which the bolt may be screwed into or out of engaged position with the bridge piece 18.

In assembling the rims on a wheel of this construction, the rim 21 first is applied in position and the hexagonal body 26 turned until said rim 21 has been firmly clamped in position. The second tire rim 17 is then applied to the wheel, but with its position reversed with respect to that of the first rim.

The lugs 22 of the second rim 17 are moved into the outer ends of the recesses 14 and the shanks 27 are passed through the apertures 24 in the projections 23 of said rim until said projections bear against the shoulders which form the outboard ends of the several bolt bodies 26. The outboard tire rim is then clamped in place by means of the lugs 15 and nuts 30 threaded upon the shanks 27. Each lug 15 is formed with an aperture 31 to receive the shank 27, and by screwing the nut 30 upon said shank the lug is forced firmly against the inclined surface of the outboard rim lug 22, thereby pushing the projection 23 of the rim 17 up against the shoulder of the bolt body 26 to clamp said rim on the wheel.

In order to permit the release of the lugs 15 and the removal of the outboard rim 17 without liability of loosening the inboard rim, I prevent the unscrewing of the bolts from the bridge piece 18 while the lugs are in place. I accomplish this by locking the bolts from turning while the nuts 30 are being unscrewed. For that purpose I provide a pin 33 extending into the aperture 31 of the lug 15 so as to engage a groove 34 in the shank 27. Preferably there is a plurality of such grooves 34 so that upon tightening the bolt the latter may be left in any one of the several positions and rigid holding of the inboard rim insured.

It will be understood that in applying the lugs 15 to the wheel, if one of the grooves 34 does not lie in position to register with the pin 33 in said lugs, the bolt may be backed off or tightened only slightly until such registry is effected. As the aperture 31 of each lug 15 is off center and is not concentric with the lug seat surface of the recess 14, and as said lug engages the rim, it cannot be turned with the bolt.

In Figs. 9, 10 and 11 there is shown a fastening member or bolt made in two pieces. In this construction a shank piece 41 is provided which has one end thereof thread screwed into the bridge piece 18 and tightened so as to remain permanently in place, and which presents a threaded portion at the other end which may be screwed into the body portion 40 to lock the rim in place.

By means of this arrangement, the shank piece 41 does not have to be removed and screwed into the bridge piece 18 every time the rims are to be demounted from the wheel, the mutilation of the threads in said bridge piece by repeated insertion and removal of the bolts being thereby avoided.

In Fig. 6 I have shown my improved fastening means adapted for use with a pair of rims of the type known to the trade as "Goodyear" rims. This type of rim is provided with an inclined surface portion 50 extending from an annular bead 51. The bolt shown has a body portion 52 provided with end flanges or shoulders 53 and 54. A short threaded shank 55 extends from one end of said bolt and is adapted to be screwed into the threaded hole of the bridge piece 18. The other end of the bolt is provided with a shank 56 which has one or more spline grooves 57. Instead of having the body portion made hexagonal for the engagement of a wrench or other tool, I may provide a hexagonal head 58 beyond the shoulder 54 so that the bolt may be turned from the outboard side.

The "Goodyear" tire rims are mounted upon and secured to the wheel in exactly the same way as are the "Firestone" rims, except that the bolt is turned until the shoulder 53 bears against the end of the bead 51 of the inboard rim 21, instead of against a lug. The outboard rim is clamped in position by means of the nuts 30 and lugs 15, said lugs forcing the edge of the bead 51 of the outboard rim 17 against the shoulder 54. The distance between the shoulders 53 and 54 is therefore greater than between the shoulders at the ends of the body 26 shown in Fig. 1.

It will be noted from Fig. 6 that the shoulder 54 has but slight clearance with the wall of the recess 14. Therefore the engagement of these two parts resists bending strains on the bolt.

It should also be noted that in the construction of Fig. 6, shoulders 53 and 54 are spaced a slight distance from the bridge piece 18 and the lug 15 respectively. This clearance may be entirely eliminated to insure the proper axial alignment of the rims with the wheel body when said rims are in clamped position.

It will also be noted that the lugs 15 have chambers 59 which receive the hexagonal heads 58 if the latter be present on the bolts as shown in Fig. 6.

In Fig. 12 is shown a form of bolt similar to that shown in Figs. 6, 7 and 8, but having the shank piece 55 detachably mounted with respect to the body portion 52 in a manner shown in the construction of Fig. 9.

The bolts and nuts may, of course, be tightened or loosened by an ordinary wrench, but preferably I provide a tool for this purpose, such as shown in Fig. 13. This has a head 60 of such depth that it may receive the shank 27 or 56 and has an end bore 61 which forms a socket to engage the hexagonal body 26 or hexagonal head 58 with which it corresponds in shape and size. This bore 61 may engage the nuts 30 to tighten or loosen the latter. The balance of the tool may be made in any suitable manner to provide a handle 62.

Having thus described my invention, what I claim as new and desire to secure by Letters Patent is:—

1. A fellyless vehicle wheel body adapted to support a pair of rims and having a plurality of spokes each formed at its end with an inclined seat for the inboard rim, said spoke also having a recess with a semi-cylindrical base in the radially inner end thereof parallel to the axis of the wheel, an approximately semi-cylindrical lug adapted to fit and slide in the recess and to be seated on said base, and having an inclined seat for the outboard rim, a plurality of bolts engaging said lugs, and adapted to force said rims into engagement with their respective seats, and shoulders presented by said bolts for holding said rims in predetermined spaced relationship.

2. A wheel body adapted to support a pair of rims, and having a plurality of spokes, each formed near its radially outer end with an inclined seat for engaging the inboard rim, and another seat near the outboard side of said spoke, an apertured lug adapted to engage said last mentioned seat and slide therealong, said lug having an inclined seat for engaging the outboard rim, a plurality of bolts having their inboard ends detachably connected to the spokes near their radially outer ends, a shoulder carried by each of said bolts for engaging the inboard rim, and adapted to force said inboard rim onto its seat, the outboard ends of the bolts projecting through their respective lugs, and nuts on the outboard ends of the bolts adapted to force the lugs into engagement with the outboard rim, the outboard end of each bolt being formed with a spline groove, and each lug having a projection adapted to engage said spline groove, whereby said bolt is held against relative rotative movement with respect to its attached lug.

3. A vehicle wheel body for supporting a pair of rims, including a plurality of tire spacers and retainers for said wheel body, each of said spacers including a body portion having shoulders at opposite ends for engagement between adjacent rims to hold said rims in spaced relationship, a shank piece connected to one end of said body portion, and having its outer end threaded, said shank piece having a threaded engagement with the wheel body, whereby upon the rotation of said body portion said body portion will be moved axially, one of said shoulders being adapted to engage with one of the rims during said axial movement, said last mentioned shoulder serving to urge said last mentioned rim axially in clamped position, another shank piece connected to the other end of said body portion, a nut polygonal in shape secured on to said last mentioned shank piece, and abutting the other shoulder, said nut being adapted to be engaged by a turning tool to rotate said body portion, and means adapted to clamp the other rim in position and in abutment with said last mentioned shoulder.

4. A fellyless vehicle wheel body adapted to support a pair of rims, and having a plurality of spokes, each formed at its outer end with an inclined seat for the inboard rim, each of said spokes having a recess disposed at the radially outer ends thereof, said recesses being opened at their radially outer ends, and having a seat at the radially inner end thereof, said last mentioned seat extending substantially parallel to the axis of the wheel, said spokes extending radially outwardly from said last mentioned seat to form side walls for said recesses, a lug adapted to seat on said last mentioned seat and to slide in said recesses, and having an inclined seat for the outboard rim, a plurality of bolts engaging said lugs, and adapted to force said rims into engagement with their respective seats, and shoulders, presented by said bolts, for holding said rims in predetermined spaced relationship.

5. A fellyless wheel body adapted to support a pair of rims, and having a plurality of spokes each formed near its radially outer end with an inclined seat for the inboard rim, and another seat near the outboard side of said wheel body, a plurality of rim spacers and retainers for said wheel body, each including a body portion having shoulders at opposite ends for engagement between adjacent rims to hold said rims in spaced relationship, a shank piece connected to one end of said body portion and having its outer end threaded into engagement with the wheel body, whereby upon rotation of said body portion said portion will be moved axially, one of said shoulders being adapted to engage the inboard rim during said axial movement, whereby said latter rim is forced axially and radially outwardly into clamped position upon said inclined seat, and each of said spacers and retainers presenting a polygonal surface adapted to be engaged by a turning tool to rotate said body portion, a lug adapted to slide along said second mentioned seat and having an inclined seat for the outboard rim, and another shank piece connected to the other end of said body portion and passing through said lug for forcing said lug axially into engagement with the outboard rim, whereby said latter rim is forced axially into contact with the other shoulder on said body portion and radially outwardly into clamped position.

6. A fellyless wheel body adapted to support a pair of rims, and having a plurality of spokes each formed near its radially outer end with an inclined seat for the inboard rim, and another seat near the outboard side of said wheel body, a plurality of rim spacers and retainers for said wheel body, each including a body portion having shoulders at opposite ends, and shank pieces at opposite ends, one of said shank pieces being adapted to be screwed into the wheel body upon rotation of said body portion to move one of said shoulders into engagement with the inboard rim, said body portion being polygonal in shape, whereby it may be engaged by a turning tool and rotated thereby, an apertured lug adapted to slide along said second mentioned seat and having an inclined seat for the outboard rim, and means on the other shank piece for forcing said lug axially into engagement with the outboard rim, and said latter rim into engagement with the other shoulder on said body portion.

7. A fellyless wheel body adapted to support a pair of rims, and having a plurality of spokes, each formed near its radially outer end with an inclined seat for the inboard rim, and another seat near the outboard side of said wheel body, a plurality of rim spacers and retainers for said wheel body, and each including a body portion having shoulders at opposite ends for engagement between adjacent rims to hold said rims in spaced relationship, a shank piece threaded into one end of said body portion and having its outer end threaded into engagement with the wheel body, whereby upon rotation of said body portion said portion will be moved axially with respect to said shank piece, one of said shoulders being adapted to engage the inboard rim during said axial movement, whereby said latter rim is forced axially and radially outwardly in clamped position upon said inclined seat, each of said spacers and retainers presenting a polygonal surface adapted to be engaged by a turning tool to rotate said body portion, another shank piece connected to the other end of said body portion, an apertured lug adapted to slide along said second mentioned seat and having an inclined seat for the outboard rim, and means connected to said last mentioned shank piece for forcing said lug axially into engagement with the outboard rim, whereby said rim is forced axially into contact with the other shoulder on said body portion and radially outwardly into clamped position.

8. In combination with a fellyless vehicle wheel body, a pair of rims each having a projection extending radially inwardly therefrom, and each having an inclined seat for the wheel body, said wheel body having a plurality of spokes, each formed near its radially outer end with an inclined seat for the inboard rim, and another seat near the outboard side of said wheel body, and a plurality of rim spacers and retainers for said wheel body, each including a body portion having shoulders at opposite ends engaging said projections to hold said rims in spaced relationship, a shank piece connected to one end of said body portion, passing through the projection on the inboard rim, and threaded into engagement with the wheel body, whereby upon rotation of said body portion said portion will be moved axially with one of said shoulders engaging the inboard rim during said axial movement and forcing said latter rim axially and radially into clamped position upon the inclined seat of said spoke, each of said spacers and retainers presenting a polygonal surface adapted to be engaged by a turning tool to rotate said body portion, another shank piece connected to the other end of said body portion and passing through the projection on the outboard rim, an apertured lug adapted to slide along the other seat on said spoke and having an inclined seat for the outboard rim, and means connected to said last mentioned shank piece for forcing said lug axially into engagement with the outboard rim for clamping said outboard rim in position with the projection thereof in contact with the other shoulder.

9. In combination with a fellyless vehicle wheel body, a pair of rims each having an annular bead presenting an inclined seat, said wheel body having a plurality of spokes each formed near its radially outer end with an inclined seat for the inboard rim, and another seat near the outboard side of said wheel body, and a plurality of rim spacers and retainers for said wheel body, each including a body portion having shoulders at opposite ends engaging said beads to hold said rims in spaced relationship, a shank piece extending from one end of said body portion, and having threaded engagement with the wheel body so that said body portion will be moved axially upon rotation thereof, and one of said shoulders will engage the bead on the inboard rim to force the latter axially and radially outwardly into clamped position upon the inclined seat of the spoke, another shank piece projecting from the other end of said body portion, an apertured lug adapted to slide along the other seat of said spoke, and having an inclined seat for the outboard rim, and means on said last mentioned shank piece for forcing said lug axially into engagement with the outboard rim to clamp said latter rim into position with the bead thereof in contact with the other shoulder.

10. A vehicle wheel body for supporting a pair of rims, including a plurality of tire spacers and retainers for said wheel body, each of said spacers including a body portion having shoulders at opposite ends for engagement between adjacent rims to hold said rims in spaced relationship, and threaded shanks at opposite ends beyond said shoulders, one of said shanks having a threaded engagement with the wheel body, whereby upon the rotation of said body portion one of said shoulders will be moved axially and will engage one of the rims to urge it axially into clamped position, a nut polygonal in shape on the other shank, and adapted to be engaged by a turning tool to rotate said body portion, an apertured lug adapted to slide along said last mentioned shank and provided with a chamber on the inboard side for receiving said nut, and means for forcing said lug into engagement with the outboard rim to clamp said rim in position.

CHARLES G. KELLER.